United States Patent

[11] 3,611,172

[72] Inventor Godfrey R. Gauld
Richmond, Ind.

[21] Appl. No. 879,185
[22] Filed Nov. 24, 1969
[45] Patented Oct. 5, 1971
[73] Assignee Avco Corporation
Cincinnati, Ohio

[54] TEMPERATURE-COMPENSATING SHUNT FOR SOLID-STATE DEVICES
5 Claims, 4 Drawing Figs.

[52] U.S. Cl. .......... 330/23, 330/13, 330/19
[51] Int. Cl. .......... H03f 1/32
[50] Field of Search .......... 307/305, 310, 313; 330/13, 17, 19, 22, 23

[56] References Cited

UNITED STATES PATENTS 2,963,656 12/1960 Parris .......... 330/19 X

OTHER REFERENCES

Parmer - " Two Easy Ways to Stabilize Power-Transistor Hi-Fi Amplifiers" Electronics October 26, 1962

*Primary Examiner*—Roy Lake
*Assistant Examiner*—Lawrence J. Dahl
*Attorney*—Hurvitz & Rose

ABSTRACT: The base emitter circuit of a transistor or the gate-cathode circuit of an SCR, operative as active elements of a circuit, are shunted by a temperature-compensating circuit consisting of a shunting transistor having a resistance connected across its base-collector circuit, the gains of the active elements and of the shunting transistor and the value of the resistance being selected to maintain gain of the active elements constant as a function of temperature. In either case for switching applications in which case the switching current is maintained constant for a wide range of temperatures, while in the case of a transistor employed for proportional amplification, gain is maintained constant and drift is avoided.

INVENTOR
GODFREY R. GAULD

BY Hurwitz & Rose
ATTORNEYS

TEMPERATURE-COMPENSATING SHUNT FOR SOLID-STATE DEVICES

BACKGROUND OF THE INVENTION

It has long been known that gain compensation of solid state amplifier devices can be accomplished by providing a suitable temperature-sensitive shunt across the drive circuit of the amplifier. In both germanium and silicon transistors, increased temperature results in an increase in the current gain ($\beta$). In an SCR the gate-firing current is reduced as the temperature increases. By shunting a greater portion of the base current of transistors or the gate current of SCR's as the temperature increases it is possible to maintain a performance which is not affected by temperature variations. Compensation can be effected for an NPN silicon emitter follower, for example, by adding resistance in series with the base and a back-biased germanium diode in shunt. However, many expedients for the same general purpose are known, and typical U.S. Pat. Nos. relating to the subject are:

| | |
|---|---|
| Overtveld | 3,430,076 |
| Williams et al. | 3,382,445 |
| Antoszewski | 3,117,253 |
| Avis | 3,136,928 |

The problem is ubiquitous, but no precise solutions have heretofore been found, i.e. circuits heretofore known effect incomplete compensation only and are not readily adjustable to improve compensation. The present invention provides for complete compensation over a wide temperature range.

SUMMARY OF THE INVENTION

A circuit for compensating gain of a solid-state amplifier, and the firing point of a solid-state switch, i.e. an SCR or a transistor, as a function of temperature, by shunting the drive circuit of the solid-state amplifier or the switch by a further transistor of opposite conductivity type, with resistance connected across its base-collector circuit, the resistance being selected to control the gain of the latter as a function of temperature such as to maintain constant the effective gain of the solid-state amplifier or switch.

DESCRIPTION OF THE PREFERRED EMBODIMENTS

Figures 1, 2, 3:
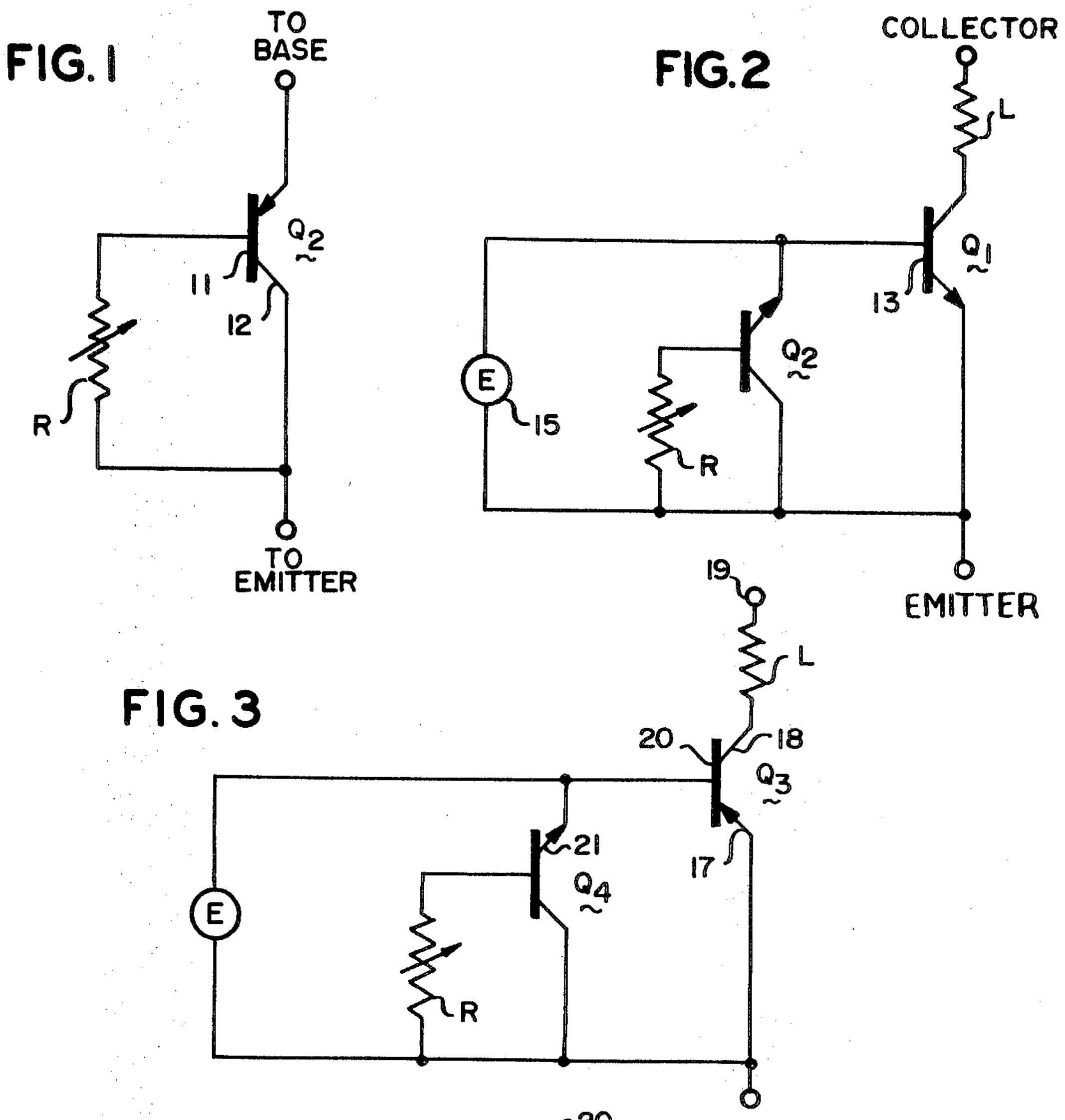
FIG. 1 is a circuit diagram of a temperature-compensating shunt circuit, according to the invention.
FIG. 2 is a circuit diagram of the compensating circuit of FIG. 1 connected to an NPN amplifier stage.
FIG. 3 is a circuit diagram of the compensating circuit of FIG. 1 connected to a PNP amplifier stage.

In FIG. 1, $Q_2$ is a PNP transistor, which may be employed as a temperature-sensitive shunt for the base to emitter circuit of a solid-state amplifier device, or the gate to cathode circuit of a solid-state switch. Connected between base 11 and collector 12 is a resistance R, which may be variable, and which establishes a resistive shunt around the base-collector circuit of $Q_2$, and thereby establishes a shunting resistance from the emitter to the collector of $Q_2$. That shunting resistance is temperature sensitive, although R is essentially not temperature sensitive, because the gain $\beta$ of $Q_2$ is temperature sensitive. The effective value of the shunt can be shown to be $$R_{\text{eff}}=\frac{R}{1+\beta_2} \qquad (1)$$

where $\beta_2$ is the gain of $Q_2$. As temperature increases, $\beta_2$ increases, resulting in lowering of $R_{eff}$.

FIG. 2 illustrates the connection of the shunt of FIG. 1 to an NPN transistor, $Q_1$. As the gain of $Q_1$ increases with temperature the shunt provided by $Q_2$ becomes of lower $R_{eff}$, shunting a greater part of the input signal away from the base 13 of $Q_1$. $Q_1$ may be provided with a collector load L, as illustrated, but an emitter load may also be provided, or a suitable bias circuit, in accordance with known principles.

In FIG. 2, signal current provided by source 15 is applied in parallel to base 13 of NPN transistor $Q_1$ and to the emitter of PNP transistor $Q_2$. The base to collector circuit of transistor $Q_2$ is shunted by resistance $R$, which can be adjusted or selected so that the $\beta$ of the transistor, which controls its impedance as a shunt, bypasses current in magnitude selected to compensate for drift of transistor $Q_1$ as a function of temperature.

Both transistor $Q_1$ and transistor $_2$ are subject to drift as a function of temperature, but these are compensatory.

If $R_{bl}$ is the base resistance of transistor $Q_1$, $\beta_2$ the gain of transistor $Q_2$, and $TC_1$ and $TC_2$ are the fractional rates of change of gain with temperature for $Q_1$ and $Q_2$, respectively, the proper value of $R$ is given by $$R=\frac{TC_2}{TC_1}\beta 2R_{b1}. \qquad (2)$$

If then $TC_2$ is approximately equal to $TC_1$, $$(3)\ R=\beta_2 R_{bl}.$$

The shunting of a portion of the base current of $Q_1$ results in a reduced effective current gain $\beta_{eff}$ of one-half $\beta_1$, where $\beta_1$ is the gain of transistor $Q_1$, provided that $TC_2 \cong TC_1$. The expression which governs where there is a disparity of temperature coefficients is $$\beta_{\text{eff}}=\frac{\frac{TC_2}{TC_1}}{\frac{TC_2}{TC_1}+1}\beta_1. \qquad (4)$$

It follows that compensation occurs even where there is a disparity of temperature coefficients, by adjustment of the value of $R$, and in such case $\beta_{eff}$ is no longer equal to one-half.

Figure 4:
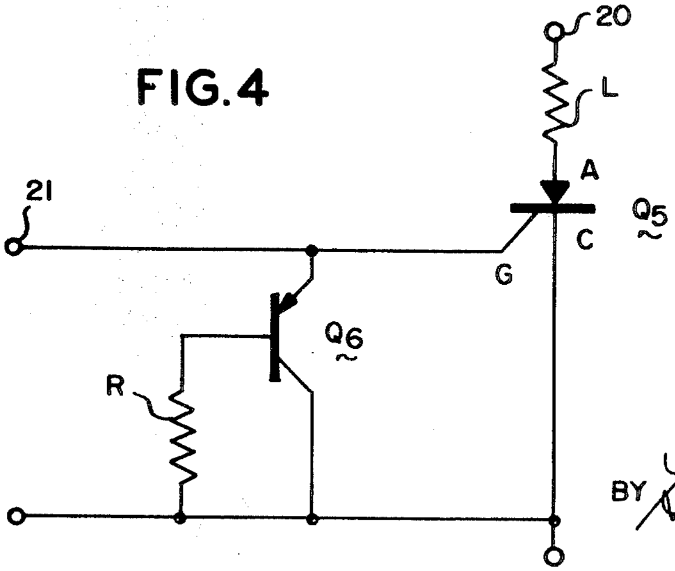
FIG. 4 is a circuit diagram of the compensating circuit of FIG. 1 connected to an SCR.

While FIG. 2 represents an embodiment of the present invention which is applicable to a PNP transistor, the principles of the invention apply to an NPN transistor, amplifier, a PNP transistor being then utilized as a shunt, as illustrated in FIG. 3, and equally as well to an SCR, as illustrated in FIG. 4. In the latter case firing current is maintained free of temperature drift.

In FIG. 3 is illustrated a PNP transistor $Q_3$, having a grounded emitter 17, and a collector 18 connected via load L to a negative supply source 19. Input signal is applied to base 20. An NPN transistor $Q_4$ is connected between emitter 17 and base 20, having its emitter 21 connected directly to base 20. A resistance R shunts the collector to base circuit of $Q_4$. The mathematical relations provided in relation to the circuit of FIG. 2 then apply equally well to the circuit of FIG. 3.

In FIG. 4, the invention is illustrated as applied to an SCR $Q_5$, having an anode A, a cathode C and a gate electrode G. A source 20, which may be alternating current pulsating or steady direct current, is applied in series between anode A and cathode C via load L. The gate electrode is provided with a gate signal input terminal 21. A PNP transistor shunt, $Q_6$, is connected between the gate electrode G and the cathode C, to provide a shunt, and the base to collector circuit of $Q_6$ is shunted in turn by resistance R.

The general philosophy of the invention is to provide a temperature-sensitive transistor shunt across the input circuit of a solid-state amplifier, the shunt being temperature sensitive and adjustable in its effect on gain, so that drift of the amplifier is obviated over a wide range of temperatures. This is accomplished by employing three electrode transistor devices as shunts, rather than diodes, thermistors, or the like, and by shunting the base to the collector circuit of the shunt by an appropriate resistance.

I claim:

1. A temperature-compensating circuit for a solid-state amplifier having output electrodes and a control electrode, said control electrode and one of said output electrodes constituting an input circuit, said solid-state amplifier having a variation of gain as a function of temperature, a shunt circuit connected across said input circuit, said shunt circuit being a transistor having an emitter, a base and a collector and having the emitter to collector circuit of said transistor connected between said control electrode and said one of said output electrodes, as a shunt circuit, and a resistance connected between said base and said collector, said resistance being selected to have a value approximately equal to the product of the gain $\beta$ of said transistor times the resistance of the input resistance of said solid-state amplifier times the ratio of the temperature coefficients of said shunt transistor and said solid-state amplifier.

2. The combination according to claim 1, wherein said temperature coefficients are at least approximately equal.

3. The combination according to claim 1, wherein said solid-state amplifier is an NPN transistor and said shunt circuit transistor is a PNP transistor.

4. The combination according to claim 1, wherein said solid-state amplifier is a PNP transistor and said shunt circuit transistor is an NPN transistor.

5. The combination according to claim 1, wherein said solid-state amplifier is an SCR.